United States Patent [19]

Shikichi et al.

[11] Patent Number: 5,151,888
[45] Date of Patent: Sep. 29, 1992

[54] OPTICAL INFORMATION PROCESSING APPARATUS IN WHICH THE OUTPUT OF AN OPTICAL SENSOR IS REPLACED BY A REFERENCE SIGNAL DURING THE OCCURRENCE OF MALFUNCTION

[75] Inventors: Satoshi Shikichi; Takashi Nakahara, both of Tokyo, Japan

[73] Assignee: Canon Kabushiki Kaisha, Tokyo, Japan

[21] Appl. No.: 400,107

[22] Filed: Aug. 29, 1989

[30] Foreign Application Priority Data

Aug. 31, 1988 [JP]   Japan ................................ 63-215254

[51] Int. Cl.⁵ ............................................. G11B 7/095
[52] U.S. Cl. .............................. 369/44.32; 369/44.25; 369/44.35; 369/44.33
[58] Field of Search ................. 369/44.11, 32, 44.13, 369/44.32, 44.41, 44.23, 44.28, 44.27, 44.38, 44.25, 44.35, 54, 58, 59, 100, 116, 44.33; 360/77.04, 78.04

[56] References Cited

U.S. PATENT DOCUMENTS 4,018,124   5/1991   Ogasawara et al. ............. 369/44.32
4,023,033   5/1977   Bricot et al. ...................... 250/201
4,736,354   4/1988   Yoshio ............................. 369/44.32

FOREIGN PATENT DOCUMENTS 62-239333   10/1987   Japan .

Primary Examiner—Roy N. Envall, Jr.
Assistant Examiner—Hung Dang
Attorney, Agent, or Firm—Fitzpatrick, Cella, Harper & Scinto

[57] ABSTRACT

An optical information processing apparatus effects recording and/or reproduction of information by scanning information tracks of an optical recording medium by at least one condensed light beam while effecting tracking and/or focusing control. The apparatus comprises at least two groups of optical sensors for receiving the light of the light beam reflected. By the medium, a circuit for producing a signal for effecting the control from the output of each of the groups of optical sensors, a reference signal generating source, and a switching circuit for causing, when at least one of the outputs of the groups of optical sensors exhibits an abnormal value, the reference signal, instead of the at least one output, to be input to the control signal producing circuit.

8 Claims, 4 Drawing Sheets

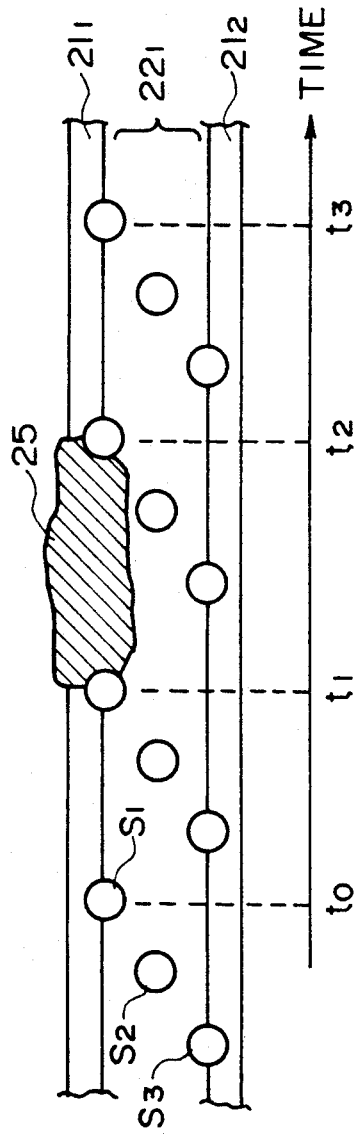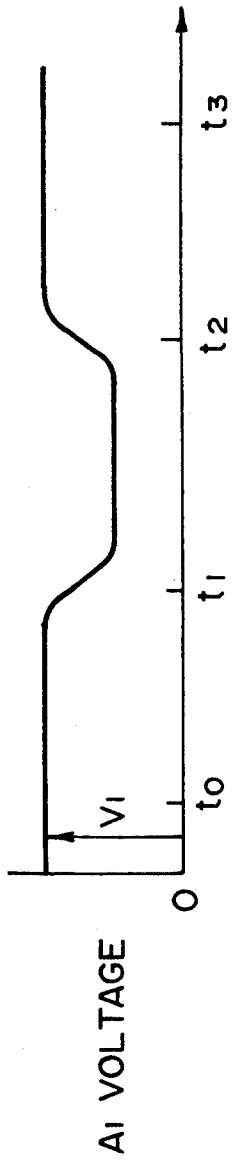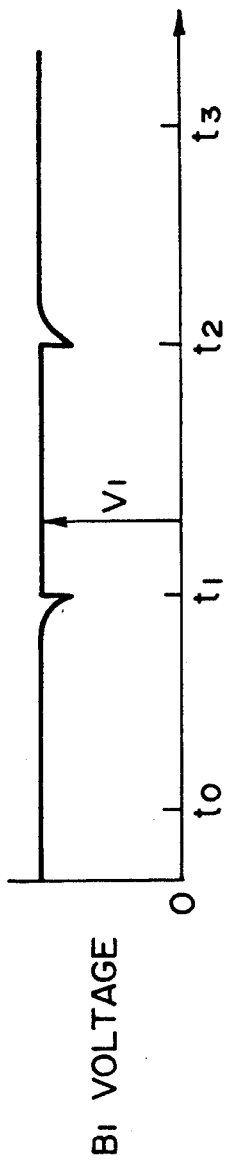

OPTICAL INFORMATION PROCESSING APPARATUS IN WHICH THE OUTPUT OF AN OPTICAL SENSOR IS REPLACED BY A REFERENCE SIGNAL DURING THE OCCURRENCE OF MALFUNCTION

BACKGROUND OF THE INVENTION

1. Field of the Invention

This invention relates to an optical information processing apparatus for effecting recording and or reproduction of information by scanning the information tracks of an optical recording medium by at least one condensed light beam while effecting tracking and/or focusing control.

2. Related Background Art

In recent years, commercialization and development of optical information processing apparatuses such as electronic file systems utilizing compact discs or postscript type discs and optical disc systems using erasable magneto-optical materials or phase shift type materials have been flourishing.

Also, attention has recently been paid particularly to an optical card system which effects the recording and reproduction of information on an optical recording medium in the form of a card (hereinafter referred to as an optical card). The optical card is characterized by its ease of portability resulting from its form, and its greater information storage capacity per area than a disc.

Recording is effected on the above-described recording medium by such that a light beam modulating in accordance with recording information. The light beam is converged into a minute spot and is scanned on the surface of the medium, whereby information is recorded as optically detectable record pit rows (information tracks). In such case, in order to record the information accurately without any problems such as intersection between the information tracks, it is necessary to control the applied position of the light beam in a direction perpendicular to the scanning direction (tracking control). It is also necessary to control the applied position of the light beam in a direction perpendicular to the surface of the optical card (focusing control) in order to apply the light spot as a minute spot of stable size in spite of any bending or mechanical error of the optical card. Tracking and focusing controls are also necessary during reproduction.

FIG. 1 of the accompanying drawings is a schematic view showing an example of the construction of an optical information processing apparatus provided with tracking and focusing control means. Such an apparatus is described in detail, for example, in Japanese Laid-Open Patent Application No. 62-239333 (corresponding U.S. Application Ser. No. 33,789, which was abandoned in favor of U.S. Application Ser. No. 479,205).

In FIG. 1, a light beam emitted from a light source 1 such as a semiconductor laser is collimated by a collimator lens 2 and divided into three beams by a diffraction grating 3. These divided light beams are reflected by a beam splitter 4, are condensed on an optical card 6 by an objective lens 5 and forms three beam spots $S_1$, $S_2$ and $S_3$. The light beams reflected by the optical card 6 again pass through the objective lens 5 and are transmitted through the beam splitter 4, whereby they are separated from the incident beams. These reflected beams are reflected by a mirror 7, are condensed by a sensor lens 8 and a cylindrical lens 9 and enter optical sensors $10_1$, $10_2$ and $10_3$. These optical sensors $10_1$, $10_2$ and $10_3$ are disposed so as to receive the light beams from the beam spots $S_1$, $S_2$ and $S_3$, respectively.

The light receiving surface of the optical sensor $10_2$ is divided into four sections as shown in FIG. 2 of the accompanying drawings, and the sum of the detection signals of the two sets of opposed light receiving surfaces is differentiated, whereby astigmatism introduced by the aforementioned cylindrical lens 9 is detected and a focusing signal is obtained by the principle of the known astigmatism method described in U.S. Pat. No. 4,023,033, for example, also, when the information is to be reproduced, a reproduction signal is obtained from the optical sensor $10_2$. The detection signals of the optical sensors $10_1$ and $10_3$ are differentiated by a differential amplifier 11, and output as a tracking signal $S_T$ from a terminal 12. This tracking signal $S_T$ and the aforementioned focusing signal are fed back to a lens actuator 18 by a circuit, not shown, and the objective lens 5 is moved in a direction perpendicular to the optic axis and in the direction of the optic axis, whereby tracking and focusing controls are accomplished.

The optical card 6 is reciprocally moved in the direction of arrow R by a driving mechanism, not shown, whereby the light spots $S_1$, $S_2$ and $S_3$ scan on the optical card. Also, an optical head 19, including the aforedescribed optical system, is designed so as to be movable in a direction perpendicular to the direction of arrow R, i.e., a direction perpendicular to the plane of the drawing sheet in FIG. 1, for the purpose of track access.

FIG. 3 of the accompanying drawings is a plan view of the optical card 6. The optical card 6 comprises a substrate formed of plastics or the like, and a recording layer 20 of silver salt, dyestuff or the like formed on the substrate. On the recording layer 20, there are preformed a plurality of parallel tracking tracks 21 optically detectable by their unevenness or the difference in reflectance with respect to the adjacent portions of the card. These tracking tracks 21 are disposed at equal intervals, and a recording area in which information may be recorded is provided between the adjacent tracking tracks.

FIG. 4 of the accompanying drawings is an enlarged view of the recording surface of the optical card 6 illustrating the recording process using the apparatus of FIG. 1. There are recording areas $22_1$ and $22_2$ between the tracking tracks $21_1$, $21_2$ and $21_3$ The beam spots $S_1$ and $S_3$ are applied so as to partly overlap the tracking tracks $21_1$ and $21_2$, and the beam spot $S_2$ is applied to the recording area $22_1$. If the applied positions of the beam spots $S_1$–$S_3$ deviate in a direction perpendicular to the tracks, there occurs an imbalance between the quantity of light of the reflected beam from the spot $S_1$ and the quantity of light of the reflected beam from the spot $S_3$. Accordingly, by differentiating a signal obtained by detecting the lights from these spots as shown in FIG. 1, there is obtained a tracking signal $S_T$ indicative of the amount and direction of the deviation. By moving the objective lens on the basis of this tracking signal, the beam spot $S_2$ is accurately directed to the recording area between the tracking tracks and information can be recorded as indicated by record pits 23. When information is to be recorded in the recording area $22_2$, the beam spots $S_1$, $S_2$ and $S_3$ may be applied to the tracking track $21_2$, the recording area $22_2$ tracking track $21_3$, respectively. The light intensity distributions of the beam spots $S_1$ and $S_3$ on the optical card are usually Gaussian distributions which are high in the central portion and therefore, if these beam spots are rendered so that one half of each of the beam spots overlaps the tracking track, the variation in quantity of light by track deviation is great and tracking signal detection of high sensitivity can be accomplished.

Now, in the method of detecting the tracking signal as described above, when there is a defect in the tracking tracks, there has been the undesirable possibility that the beam spot $S_2$ for recording and reproduction deviates from the recording area $22_1$.

Such a situation is shown in FIG. 5 of the accompanying drawings. FIG. 5 shows a situation in which a defective portion 25 is in the tracking track $21_1$ shown in FIG. 4 and FIG. 5 further shows times $t_0$-$t_1$ corresponding to the scanning position of the beam spot $S_1$ applied to this track.

The reflectance of the defective portion 25 is lower than that of the normal or unaffected portions of tracking tracks $21_1$ and $21_2$.

At the time $t_0$, the spot $S_1$ overlaps a normal or unaffected portion of the track $21_1$. Next, when at the time $t_1$, the spot S overlaps the defective portion 25, there arises an imbalance between the quantity of light of the reflected beam from the spot $S_1$ and the quantity of light of the reflected beam from the spot $S_3$, whereby a fluctuation occurs in the applied position of the spots to effect an auto tracking operation. However, if as shown, the defective portion 25 is relatively wide, at time $t_1'$, the spot $S_2$ will deviate from the recording area $22_1$ and normal recording and reproduction of information will become impossible.

Also, the situation in which an abnormality occurs in the control operation due to such defect or the like of the medium as described above might also affect the focusing control.

SUMMARY OF THE INVENTION

It is an object of the present invention to solve the above-noted problems peculiar to the prior art and to provide an optical information processing apparatus which can effect tracking and/or focusing control normally even when there is a defect in a medium.

The above object of the present invention is achieved by an optical information processing apparatus for effecting the recording and/or reproduction of information by scanning the information tracks of an optical recording medium by at least one condensed light beam while effecting tracking and/or focusing control. The apparatus comprises at least two groups of optical sensors for receiving the light of the light beam reflected by the medium, a circuit for producing a signal for effecting control from the output of each of the groups of optical sensors, a reference signal generating source, and a switching circuit for causing, when at least one of the outputs of the groups of optical sensors exhibits an abnormal value, the reference signal, instead of the at least one output, to be input to the control signal producing circuit.

BRIEF DESCRIPTION OF THE DRAWINGS

FIGS. 7A-7C show the states of beam spots when a defective track is scanned in the present invention and signal wave forms in various portions of the then circuit of FIG. 6.

DESCRIPTION OF THE PREFERRED EMBODIMENT

Figure 1:
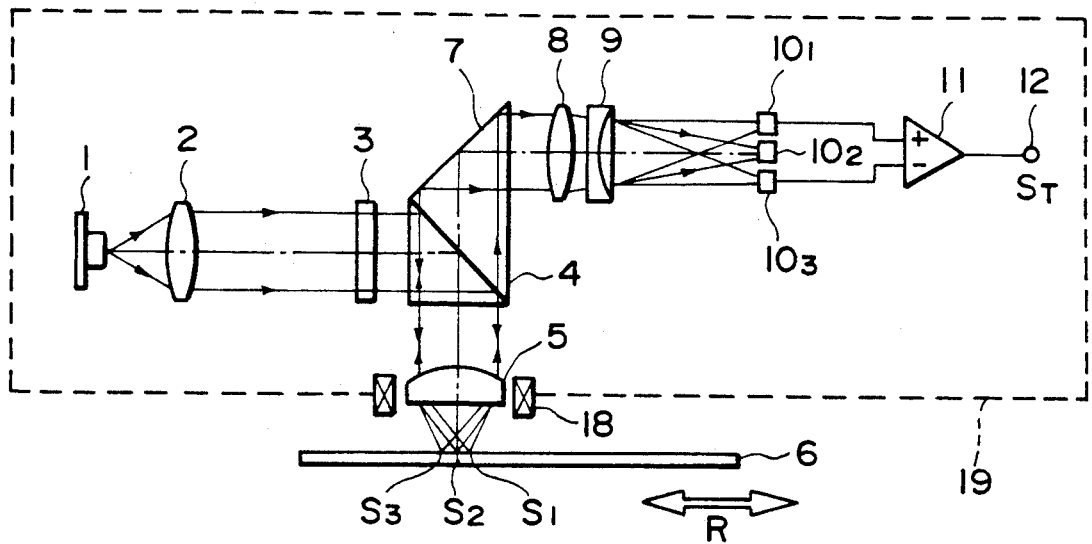
FIG. 1 is a schematic view showing an example of the construction of an optical information processing apparatus according to the prior art.
Figure 2:
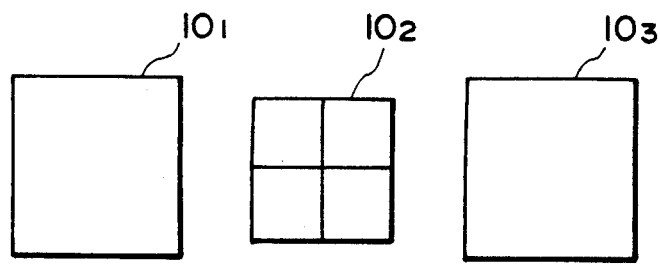
FIG. 2 is a schematic view showing the construction of optical sensors in the apparatus shown in FIG. 1.
Figure 3:
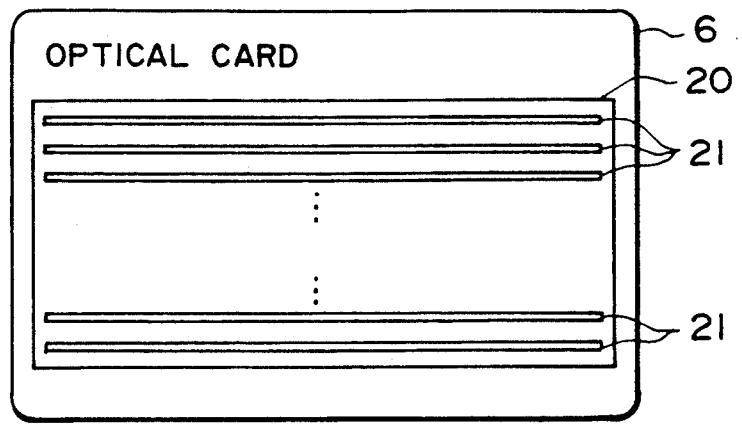
FIG. 3 is a plan view of an optical card used in the apparatus shown in FIG. 1.
Figure 4:
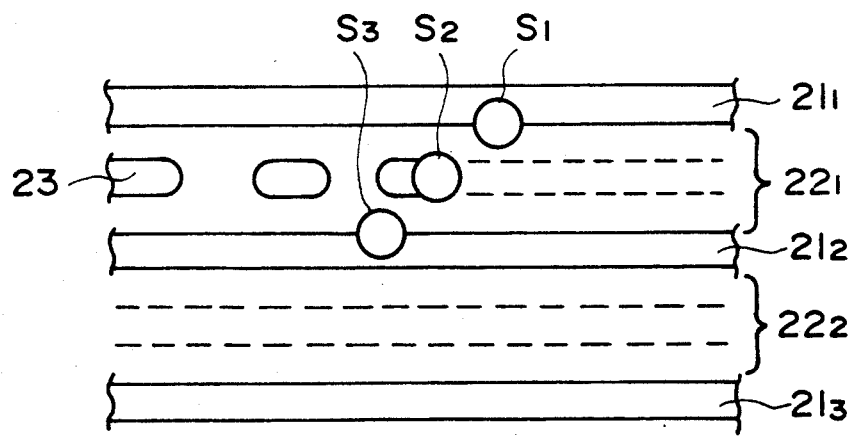
FIGS. 4 and 5 are schematic views illustrating the manner of tracking control in the apparatus shown in FIG. 1.
Figure 5:
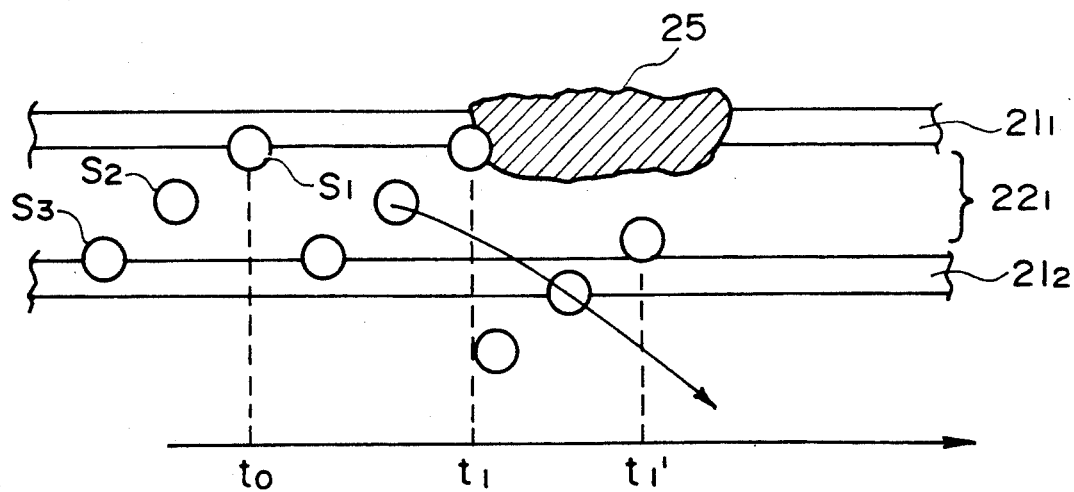
Figure 6:
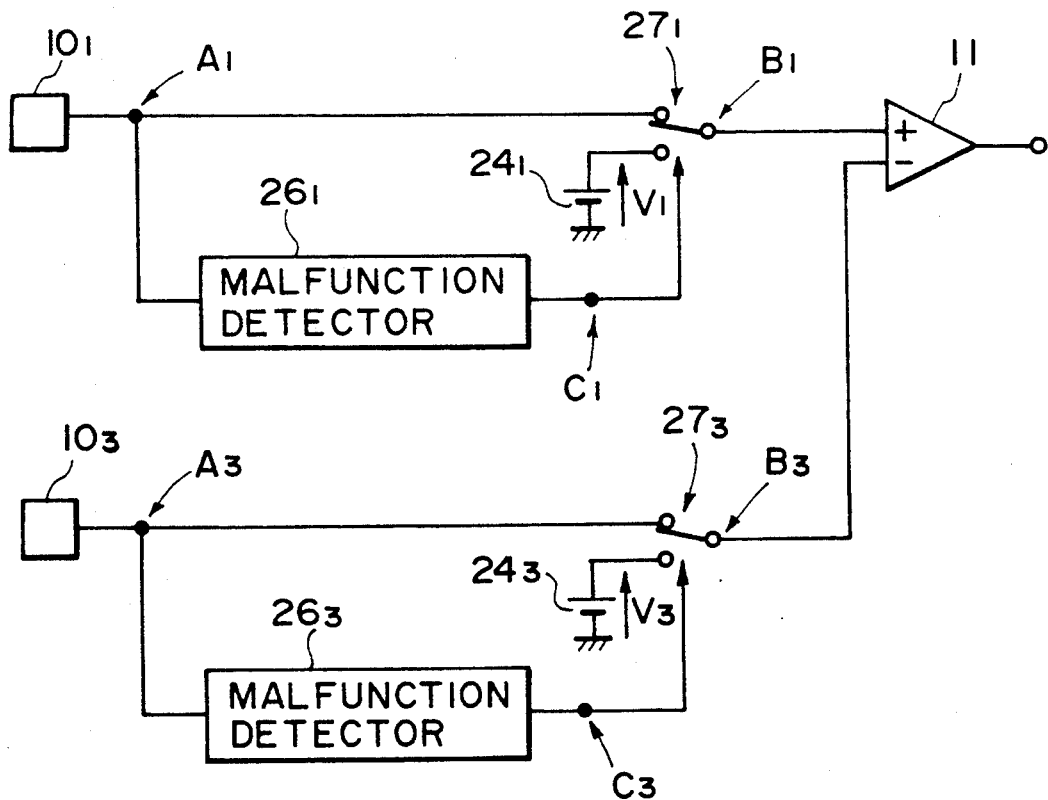
FIG. 6 is a schematic diagram showing an embodiment of a tracking control circuit used in the apparatus of the present invention.

FIG. 6 is a schematic diagram showing an embodiment of a tracking control circuit used in the apparatus of the present invention. The apparatus of the present invention can be made similar in construction to the prior-art apparatus, except for this circuit. FIG. 7A shows the states of beam spots when a defective track is scanned, and FIGS. 7B and 7C show the corresponding signal wave forms of various portions of the circuit of FIG. 6. In FIGS. 6 to 7C, members identical to those in FIGS. 1 to 5 are given identical reference characters and need not be described in detail.

In FIG. 6, the reflected beams from beam spots $S_1$ and $S_3$ applied to tracking tracks $21_1$ and $21_2$, respectively, shown in FIG. 7A are received by optical sensors $10_1$ and $10_3$ and output as signals $A_1$ and $A_3$, respectively. The optical sensors $10_1$ and $10_3$ are connected to a differential amplifier 11 through switches $27_1$ and $27_3$ and also are connected to malfunction detectors $26_1$ and $26_3$, respectively. The output terminals of the malfunction detectors $26_1$ and $26_3$ are connected to the switches $27_1$ and $27_3$, respectively.

The malfunction detectors $26_1$ and $26_3$ are designed to output detection signals $C_1$ and $C_3$, respectively, when the voltages of the signals $A_1$ and $A_3$ from the optical sensors $10_1$ and $10_3$ greatly deviate from a predetermined value.

Voltage sources $24_1$ and $24_3$ are connected to terminals of the switches $27_1$ and $27_3$, respectively, and voltages $V_1$ and $V_3$ equal to the voltages of the signals $A_1$ and $A_3$ when the signals detected by the optical sensors $10_1$ and $10_3$ are normal are output from the respective voltage sources. The switches $27_1$ and $27_3$ are designed to be connected to the voltage sources $24_1$ and $24_3$ when the detection signals $C_1$ and $C_3$ from the malfunction detectors $26_1$ and $26_3$ are output so that the voltages $V_1$ and $V_3$ are supplied to the differential amplifier 11.

In such a construction, the switches $27_1$ and $27_3$ are connected so as to supply the signals $A_1$ and $A_3$ output from the optical sensors $10_1$ and $10_3$ when these signals $A_1$ and $A_3$ exhibit normal values, and are connected so as to supply the voltages $V_1$ and $V_3$ output from the voltage sources when the voltages of the signals $A_1$ and $A_3$ from the optical sensors $10_1$ and $10_3$ deviate greatly from a predetermined value.

Accordingly, for example, when the signal $A_1$ detected from the optical sensor $10_1$ exhibits an abnormal value due to a defect of the tracking track $21_1$ when tracking is effected, the voltage $V1_1$ of a predetermined value produced from the voltage source $24_1$ can be used instead of the signal $A1_1$ which has exhibited the abnormal value to produce a normal servo error signal.

The operation of the tracking circuit will now be described with reference to FIGS. 7A to 7C.

In FIG. 7A, the reference numerals $21_1$ and $21_2$ designate the tracking tracks, the reference numeral $22_1$ denotes a recording area, and $S_1$, $S_2$ and $S_3$ show the locations at which beam spots are applied to these tracks and the recording area at times $t_0$, $t_1$, $t_2$ and $t_3$. In FIG. 7A, a defective portion 25 is created at a location on the tracking track $21_1$ which corresponds to the times $t_1$-$t_2$. It is to be understood that in the tracking track $2_1$, the other portion than the defective portion 25 is a normal portion.

FIGS. 7B and 7C show the voltage of the signal $A_1$ and the voltage of the signal $B_1$ which correspond to the above-described change in time.

At the time $t_0$, the spot $S_1$ partly overlaps the normal portion of the track $21_1$. In this case, the detection signal $C_1$ is not output from the malfunction detector 26, and the switch $27_1$ inputs the detection signal A from the optical sensor $10_1$ as the signal $B_1$ to the differential amplifier 11.

Next, at the time $t_l$, when the spot $S_1$ partly overlaps the defective portion 25, the voltage of the signal $A_1$ decreases and the malfunction detector $26_1$ operates and outputs the detection signal $C_1$. Thereby, the switch $27_1$ is changed over to the voltage source $24_1$ side and the voltage $V_1$ is input to the differential amplifier 11. Since this voltage $V_1$ exhibits the same value as a signal $A_1$ when the detection signal from the optical sensor $10_1$ exhibits a normal value, no change occurs to the signal $B_l$ output from the switch $27_1$ and therefore, the spot $S_2$ does not deviate from the recording area.

In this case, the voltage $V_1$ exhibits a predetermined value, but in the optical sensor $10_3$, the signal $A_3$ from this optical sensor $10_3$ is input as signal $B_3$; to the differential amplifier 11 and therefore, this state can be said to be a state in which the tracking servo is operating. However, in this state, the tracking servo gain is $\frac{1}{2}$ and therefore, the amplification degree of a circuit, not shown, can be doubled to thereby keep the tracking servo gain constant.

When at the time $t_2$, the spot $S_1$ leaves the defective portion 25 and the voltage of the signal $A_1$ increases, the signal $C_1$ is not output from the malfunction detector $26_1$ and the switch $27_1$ changes over to its original state and inputs the signal $A_1$ from the optical sensor $10_1$ to the differential amplifier 11.

At the time $t_3$, the circuit is in the same state as that at the time $t_0$.

The tracking control portion used in the foregoing description has been described with respect to the tracking signal detection when there is a defect in one tracking track $21_1$. but when there is a defective portion in the other tracking track $21_2$, the malfunction detector $26_3$, the voltage source $24_3$ and the switch $27_3$ operate in the same manner as described above.

While the tracking control circuit has been described above, the present invention is also applicable to a focusing control circuit. In such case, for example, in the optical sensor $10_2$ shown in FIG. 2, the sum signals of the two sets of opposed light receiving surfaces are used as the signals $A_1$ and $A_3$. respectively, of the circuit shown in FIG. 6. A focusing signal is output from the differential amplifier 11 toward a lens actuator.

The present invention permits various applications besides the above-described embodiment. For example, the tracking signal and the focusing signal may be detected not only by the aforedescribed three-beam method and astigmatism method, but also by other methods.

The present invention covers all such applications without departing from the scope thereof as defined in the appended claims.

What is claimed is:

1. An optical information processing apparatus for effecting the recording and/or reproduction of information by scanning information tracks of an optical recording medium by at least one condensed light beam while effecting tracking and/or focusing control, said apparatus comprising:
    at least two groups of optical sensors for receiving light of the light beam reflected by the medium and for generating respective output signals;
    a control signal producing circuit for producing a signal for effecting the tracking and/or focusing control using the output signal of each of said groups of optical sensors;
    a plurality of reference signal generating sources for generating a plurality of reference signals; and
    a switching circuit for cuasing, when at least one of the output signals of said groups of optical sensors exhibits an abnormal value, a respective reference signal, instead of the at lest one output signal having an abnormal value, to be input to said control signal producing circuit.

2. An optical information processing apparatus according to claim 1, wherein said switching circuit selects at least one of the output signals of said groups of optical sensors and the reference signal to be input to said control signal producing circuit, and further comprising a switch and a malfunction detector for controlling change-over of said switch.

3. An optical information processing apparatus according to claim 2, wherein said malfunction detector outputs a detection signal to said switch if at least one of the output signals of said groups of optical sensors deviates greatly from a predetermined value.

4. An optical information processing apparatus according to claim 1, wherein the magnitude of the reference signal is set so as to be equal to the magnitude of the output signals of said groups of optical sensors when said optical sensors are operating normally.

5. An optical information processing apparatus according to claim 1, wherein the servo gain of the tracking and/or focusing control is doubled when the reference signal is input to said control signal producing circuit.

6. An optical information processing apparatus according to claim 1, wherein three light beams are applied to the medium, and said groups of optical sensors include two optical sensors for receiving reflected light of two of the three light beams.

7. An optical information processing apparatus for effecting the recording and/or reproduction of information while converging a light beam emitted from a light source onto a recording medium by an objective lens and effecting tracking and/or focusing servo control of the light beam, said apparatus comprising:
    an optical sensor for receiving light of the light beam reflected by the medium and for generating an output signal;
    a tracking and/or focusing error signal generating circuit for generating a tracking error signal and/or a focusing error signal from the output signal of said optical sensor;
    a lens actuator for moving the objective lens in a tracking and/or focusing direction on the basis of the generated tracking error signal and/or focusing error signal, wherein said optical sensor, said lens actuator and said tracking and/or focusing error signal generating circuit comprise a tracking and/or focusing servo control loop;

an abnormality detecting circuit for detecting an abnormality of a signal corresponding to the output signal of said optical sensor;

a switching circuit for opening said tracking and/or focusing servo control loop when said abnormality detecting circuit detects an abnormality of the signal corresponding to the output signal of said optical sensor; and reference signal generating means for supplying a predetermined reference signal to said lens actuator when said tracking and/or focusing servo control loop is opened by said switching circuit.

8. An optical information processing method for effecting the recording and/or reproduction of information while converging a light beam emitted from a light source onto a recording medium by an objective lens and effecting tracking and/or focusing servo control of the light beam, said method comprising the steps of:

receiving light reflected from the recording medium by a plurality of sensors and generating respective output signals;

generating a tracking error signal and/or a focusing error signal from the respective output signals of the plurality of sensors;

detecting any abnormality of the respective output signals of the plurality of sensors; and generating a tracking error signal and/or a focusing error signal by using a predetermined reference signal, instead of the respective output signal of each sensor whose output signal exhibits an abnormal value, when detecting an abnormality of the respective output signal of at least one of the plurality of sensors.

* * * * *

UNITED STATES PATENT AND TRADEMARK OFFICE
CERTIFICATE OF CORRECTION

PATENT NO. : 5,151,888

DATED : September 29, 1992

INVENTOR(S) : Satoshi Shikichi, et al.

It is certified that error appears in the above-identified patent and that said Letters Patent is hereby corrected as shown below:

ON THE TITLE PAGE

UNDER "U.S. PATENT DOCUMENTS"

"4,018,124 5/1991 Ogasawara et al." should read --"5,018,124 5/1991 Ogasawara et al.--.

IN THE ABSTRACT

Line 7, "reflected. By" should read --reflected by--.

COLUMN 1

Line 62, "forms" should read --form--.

COLUMN 2

Line 12, "example, also" should read --example. Also--.

UNITED STATES PATENT AND TRADEMARK OFFICE
CERTIFICATE OF CORRECTION

PATENT NO. : 5,151,888

DATED : September 29, 1992

INVENTOR(S) : Satoshi Shikichi, et al.

It is certified that error appears in the above-identified patent and that said Letters Patent is hereby corrected as shown below:

COLUMN 4

Line 9, "then" should be deleted.

COLUMN 5

Line 28, "signal $B_t$" should read --signal $B_1$--.

COLUMN 6

Line 20, "cuasing," should read --causing,--; and
　　Line 23, "lest" should read --least--.

Signed and Sealed this

Second Day of November, 1993

Attest:

BRUCE LEHMAN

*Attesting Officer*　　　　*Commissioner of Patents and Trademarks*